(12) United States Patent
Lai et al.

(10) Patent No.: US 8,704,947 B2
(45) Date of Patent: Apr. 22, 2014

(54) WIRELESS AV TRANSMISSION AND RECEIVER MODULES, PORTABLE WIRELESS AV TRANSMISSION AND RECEIVER DEVICES, AND AV SOURCE AND PLAYBACK DEVICES

(75) Inventors: Chin-Ding Lai, Taipei (TW); Meng-Long Wu, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 13/179,763

(22) Filed: Jul. 11, 2011

(65) Prior Publication Data
US 2012/0169925 A1 Jul. 5, 2012

(30) Foreign Application Priority Data
Jan. 4, 2011 (CN) .................... 2011 2 0004732 U

(51) Int. Cl.
*H04N 7/00* (2011.01)
*H04N 7/01* (2006.01)
*H04H 40/27* (2008.01)

(52) U.S. Cl.
USPC ................. 348/552; 348/441; 455/3.06

(58) Field of Classification Search
USPC .......... 348/441, 723, 14.01, 14.04, 373, 552; 455/3.01, 3.06; 725/74, 81, 151, 153; 370/468, 469, 401
See application file for complete search history.

(56) References Cited

U.S. PATENT DOCUMENTS

| 5,568,205 | A | * | 10/1996 | Hurwitz | 348/723 |
|---|---|---|---|---|---|
| 7,796,162 | B2 | * | 9/2010 | Ortiz | 348/211.8 |
| 2004/0252562 | A1 | * | 12/2004 | Kim | 365/200 |
| 2005/0135611 | A1 | * | 6/2005 | Hardacker | 380/33 |
| 2005/0136990 | A1 | * | 6/2005 | Hardacker et al. | 455/572 |
| 2005/0264704 | A1 | * | 12/2005 | Leinonen | 348/723 |
| 2006/0023818 | A1 | * | 2/2006 | Lee et al. | 375/347 |
| 2006/0209892 | A1 | * | 9/2006 | MacMullan et al. | 370/468 |
| 2007/0015485 | A1 | * | 1/2007 | DeBiasio et al. | 455/345 |
| 2007/0083903 | A1 | * | 4/2007 | Wan et al. | 725/100 |
| 2008/0198264 | A1 | * | 8/2008 | Balram | 348/459 |
| 2008/0252722 | A1 | * | 10/2008 | Wang et al. | 348/143 |
| 2009/0256922 | A1 | * | 10/2009 | Gersten et al. | 348/222.1 |
| 2011/0057967 | A1 | * | 3/2011 | Adachi et al. | 345/690 |
| 2011/0196521 | A1 | * | 8/2011 | Jain et al. | 700/94 |
| 2012/0133828 | A1 | * | 5/2012 | Shao et al. | 348/441 |

* cited by examiner

*Primary Examiner* — Victor Kostak
(74) *Attorney, Agent, or Firm* — Rosenberg, Klein & Lee

(57) ABSTRACT

A wireless audio-video (AV) transmission module is to be disposed in an AV source device. The AV source device includes an AV source unit for generating an AV signal. The wireless AV transmission module includes a video scaler unit and a wireless transmission unit. The video scaler unit is to be coupled electrically to the AV source unit, upscales a video signal of the AV signal from the AV source unit, and outputs an upscaled AV signal including the upscaled video signal. The wireless transmission unit is coupled electrically to the video scaler unit and wirelessly transmits the upscaled AV signal that includes the upscaled video signal.

10 Claims, 7 Drawing Sheets

WIRELESS AV TRANSMISSION AND RECEIVER MODULES, PORTABLE WIRELESS AV TRANSMISSION AND RECEIVER DEVICES, AND AV SOURCE AND PLAYBACK DEVICES

CROSS-REFERENCE TO RELATED APPLICATION

This application claims priority of Chinese Application No. 201120004732.X, filed on Jan. 4, 2011.

BACKGROUND OF THE INVENTION

1. Field of the Invention

The present invention relates to wireless audio-video (AV) transmission and receiver devices, more particularly to wireless AV transmission and receiver devices capable of improving quality of a video signal.

2. Description of the Related Art

A conventional audio-video (AV) source device, such as a computer, a game console, a Blu-ray Disc player or a multimedia player, is usually connected to a television or a projector through a transmission line so as to output AV content via the television or the projector. Moreover, since High Definition Multimedia Interface (HDMI) is capable of transmitting uncompressed audio signals and video signals through a single transmission line, which is relatively convenient compared with traditional component video transmission and fiber transmission, HDMI has become a popular AV transmission interface. However, HDMI transmission line unavoidably has an issue of signal attenuation in case of long distance signal transmission. Especially when there is a need for connection to a projector or for longer wires resulting from interior decoration, signal attenuation becomes more severe. Furthermore, a high price of HDMI is relatively hard to be accepted by most consumers.

Therefore, in recent years, companies in the industry have put efforts to develop wireless AV transmission, such as WirelessHD (High Definition), Wireless HDMI and WHDI (Wireless Home Digital Interface), each of which has been adopted in AV devices. The wireless AV transmission generally uses 5 GHz or 60 GHz frequency bands, and is capable of wirelessly transmitting 1080p/60 Hz Deep Color Full HD AV signals to a specific distance. Therefore, by means of disposing a wireless AV transmitter on an AV source device terminal such as a computer, a game console, a Blu-ray Disc player or a multimedia player, and by means of disposing a wireless AV receiver on an AV playback device terminal such as a digital television or a projector, wireless AV transmission may be performed between the AV source device terminal and the AV playback device terminal.

However, current wireless AV transmission is adopted primarily for transmitting a HD video signal to a HD playback device such as a digital television. If a lower resolution video signal such as a VGA signal is transmitted, images displayed on the HD playback device may be deformed or distorted arising from lower resolution.

SUMMARY OF THE INVENTION

Therefore, an object of the present invention is to provide wireless audio-video (AV) transmission and receiver modules, portable wireless AV transmission and receiver devices, and AV source and playback devices provided with the wireless AV transmission and receiver modules respectively which are capable of improving image quality of low resolution video signals transmitted via wireless transmission.

According to a first aspect, the wireless AV transmission module of the present invention is to be disposed in an AV source device. The AV source device includes an AV source unit for generating an AV signal. The wireless AV transmission module comprises a video scaler unit and a wireless transmission unit. The video scaler unit is to be coupled electrically to the AV source unit, and is for upscaling a video signal of the AV signal from the AV source unit, and outputting an upscaled AV signal including the upscaled video signal. The wireless transmission unit is coupled electrically to the video scaler unit, and is for wirelessly transmitting the upscaled AV signal that includes the upscaled video signal.

According to a second aspect, a portable wireless AV transmission device of the present invention is for pluggable connection to an AV source device. The AV source device includes an AV source unit for generating an AV signal, and an output terminal for outputting the AV signal. The portable wireless AV transmission device comprises a connector, a video scalter unit and a wireless transmission unit. The connector is to be pluggably and electrically coupled to the output terminal of the AV source device for receiving the AV signal. The video scaler unit is coupled electrically to the connector, and is for upscaling a video signal of the AV signal received through the connector, and outputting an upscaled AV signal including the upscaled video signal. The wireless transmission unit is coupled electrically to the video scaler unit, and is for wirelessly transmitting the upscaled AV signal that includes the upscaled video signal.

According to a third aspect, the wireless AV receiver module of the present invention is to be disposed in an AV playback device. The AV playback device includes an AV playback unit and a high resolution display. The wireless AV receiver module comprises a wireless receiver unit and a video scaler unit. The wireless receiver unit is for receiving an AV signal. The video scaler unit is coupled electrically to the wireless receiver unit and is to be coupled to the AV playback unit. The video scaler unit is for upscaling a video signal of the AV signal received through the wireless receiver unit, and outputting an upscaled AV signal including the upscaled video signal to the AV playback unit, such that the upscaled video signal is outputted to the high resolution display.

According to a fourth aspect, the portable wireless AV receiver device of the present invention is for pluggable connection to an AV playback device. The AV playback device includes an input terminal, an AV playback unit, and a high resolution display. The portable wireless AV receiver device comprises a wireless receiver unit, a video scaler unit and a connector. The wireless receiver unit is for receiving an AV signal. The video scaler unit is coupled electrically to the wireless receiver unit, and is for upscaling a video signal of the AV signal received through the wireless receiver unit, and outputting an upscaled AV signal including the upscaled video signal. The connector is coupled electrically to the video scaler unit for receiving the upscaled AV signal. The connector is to be pluggably and electrically coupled to the input terminal of the AV playback device for transmitting the upscaled AV signal including the upscaled video signal to the AV playback unit via the input terminal, such that the upscaled video signal is outputted to the high resolution display.

According to a fifth aspect, the AV source device of the present invention comprises an AV source unit, a video scaler unit, and a wireless transmission unit. The AV source unit is for generating an AV signal. The video scaler unit is coupled electrically to the AV source unit, and is for upscaling a video signal of the AV signal from the AV source unit, and outputting an upscaled AV signal including the upscaled video signal. The wireless transmission unit is coupled electrically to the video scaler unit, and is for wirelessly transmitting the upscaled AV signal that includes the upscaled video signal.

According to a six aspect, the AV playback device of the present invention comprises an AV playback unit, a high resolution display, a wireless receiver unit for receiving an AV signal, and a video scaler unit. The video scaler unit is coupled electrically to the wireless receiver unit and the AV playback unit, and is for upscaling a video signal of the AV signal received through the wireless receiver unit, and outputting an upscaled AV signal including the upscaled video signal to the AV playback unit, such that the upscaled video signal is outputted to the high resolution display.

Preferably, the video signal is a Standard-Definition Television (SDTV) signal, and the video scaler unit is a video scaler chip which upscales the SDTV signal from a standard definition to a high definition and outputs the upscaled video signal, in which the upscaled video signal is a High-Definition Television (HDTV) signal.

Preferably, the wireless transmission unit and the wireless receiver unit adopt Wireless Home Digital Interface (WHDI) technology for transmitting and receiving the upscaled AV signal.

BRIEF DESCRIPTION OF THE DRAWINGS

Other features and advantages of the present invention will become apparent in the following detailed description of the four preferred embodiments with reference to the accompanying drawings, of which.

DETAILED DESCRIPTION OF THE PREFERRED EMBODIMENTS

Figure 1:
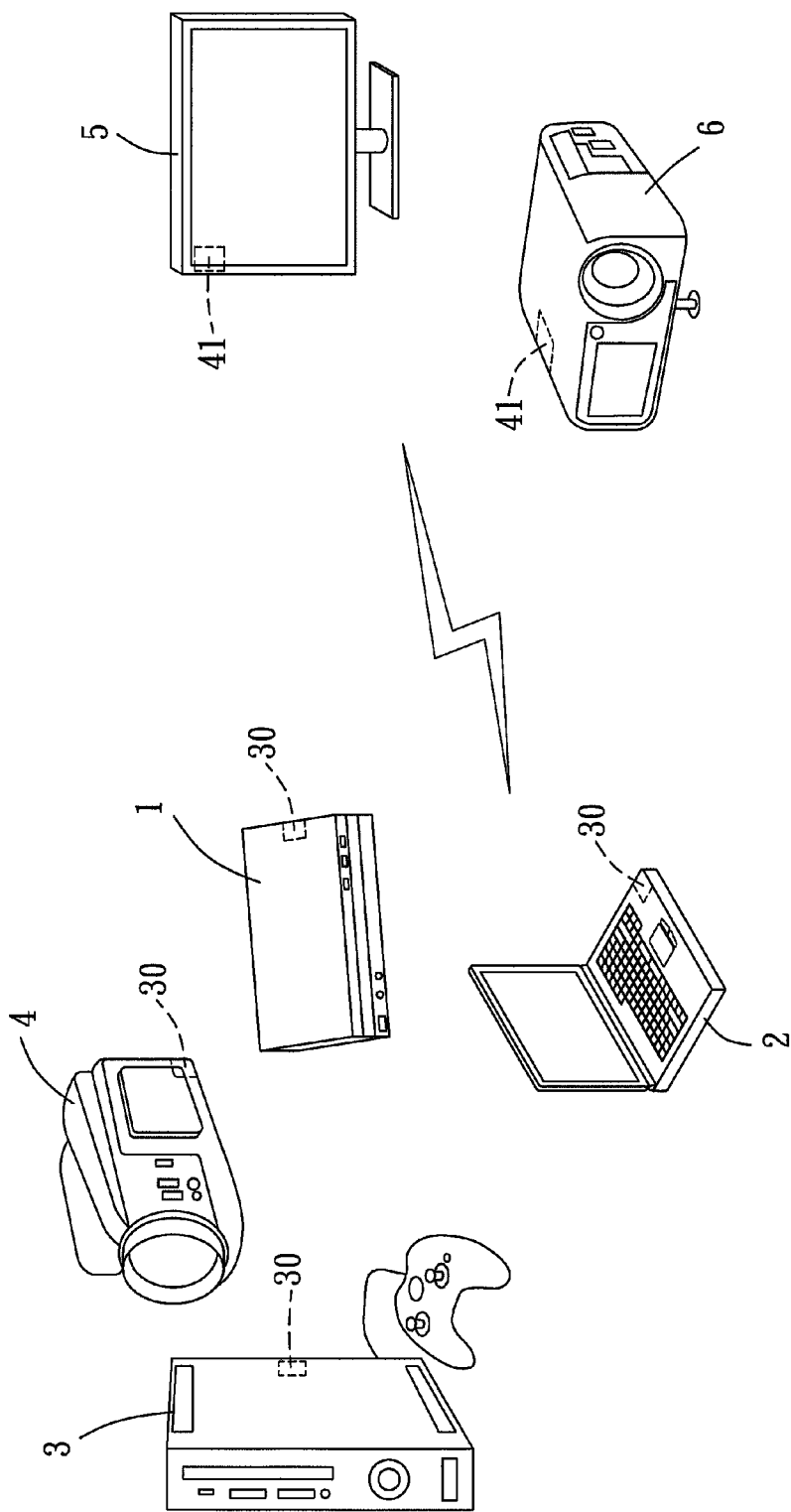
FIG. 1 is a schematic diagram illustrating a first preferred embodiment of the wireless audio-video (AV) transmission module of the present invention applied in different AV source devices, so as to upscale an AV signal generated from the AV source device and to wirelessly transmit an upscaled AV signal to different AV playback devices.

Before the present invention is described in greater detail with reference to the preferred embodiments, it should be noted that the same reference numerals are used to denote the same elements throughout the following description.

Figure 2:
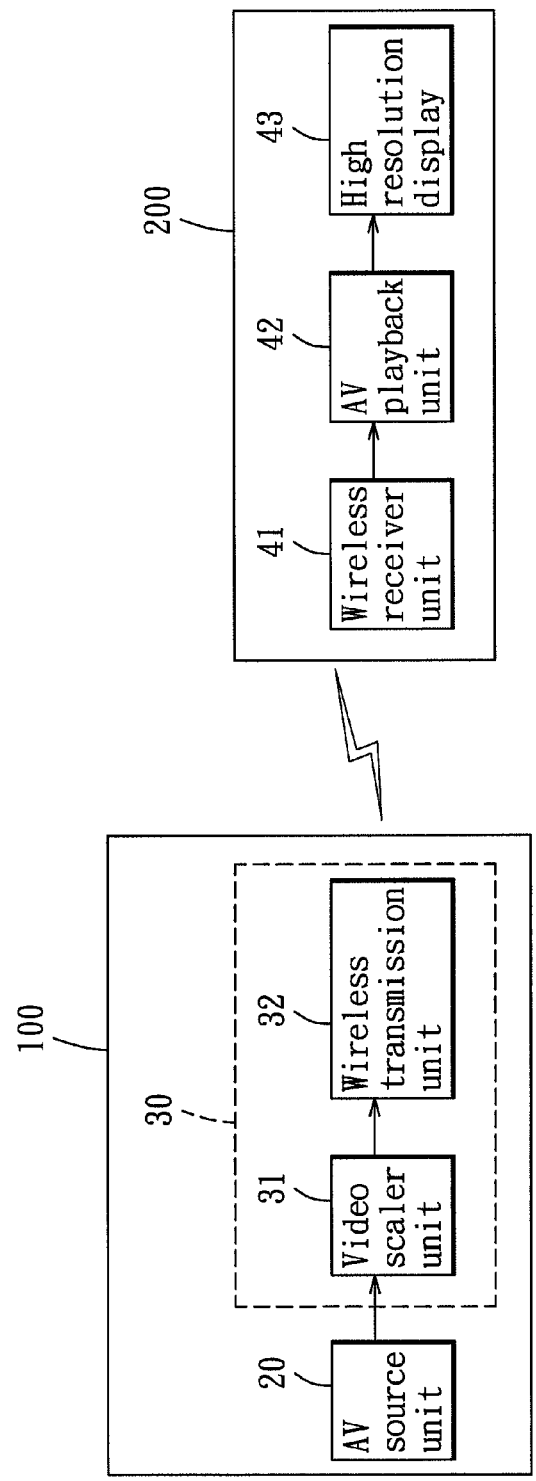
FIG. 2 is a block diagram illustrating the AV source device and the AV playback device in the first preferred embodiment of the wireless AV transmission module.

Referring to FIG. 1 and FIG. 2, a first preferred embodiment of a wireless audio-video (AV) transmission module 30 of the present invention is applied in an AV source device 100 such as a multi-media player 1, a notebook computer 2 (or a personal computer), a game console 3, or a video camera 4. The wireless AV transmission module 30 is built into the AV source device 100, and is for upscaling an AV signal generated by the AV source device 100 and wirelessly transmitting the upscaled AV signal to an AV playback device 200 such as a digital television 5 or a projector 6.

Referring to FIG. 2, the AV source device 100 includes a central processing unit (not shown) for controlling system operation thereof. The AV source device 100 further includes an AV source unit 20 and related circuits (not shown) for generating an AV signal. The wireless AV transmission module 30 in this embodiment includes a video scaler unit 31 and a wireless transmission unit 32.

In this embodiment, a video signal of the AV signal generated by the AV source unit 20 is a 480i Standard-Definition Television (SDTV) signal with a 4:3 aspect ratio, but should not be limited to the disclosure herein. The video signal of the AV signal may be other video signals with lower resolution, for example, a 576i SDTV signal or a YCbCr 4:2:2 video signal outputted from a DVD player, a video camera or a digital television.

The video scaler unit 31 is coupled electrically to the AV source unit 20, and is for upscaling a video signal of the AV signal from the AV source unit 20, and outputting the upscaled AV signal including the upscaled video signal. In this embodiment, the video scaler unit 31 adopts a video upscaler chip BU1521GVW manufactured by ROHM, but is not limited to the disclosure of this embodiment. The video upscaler chip upscales the video signal generated by the AV source unit 20 from a standard definition to a high definition, for example, upscaling a video signal from 480i to 480p, from 576i to 576p, or from YCbCr 4:2:2 to 1080/50i or 1080/50p HDTV video signals.

The wireless transmission unit 32 is coupled electrically to the video scaler unit 31, and is for modulating the upscaled AV signal that includes the upscaled video signal, which is from the video scaler unit 31, into a wireless AV signal, and for wirelessly transmitting the wireless AV signal. In this embodiment, the wireless transmission unit 32 may adopt a transmitter chip AMN2120 or AMN3110 which is manufactured by Amimon and which applies WHDI technology, but is not limited to the disclosure of this embodiment.

The AV playback device 200 includes a wireless receiver unit 41, an AV playback unit 42, and a high resolution (or HD) display 43. The wireless receiver unit 41 is matched with the wireless transmission unit 32 of the AV source device 100. In this embodiment, the wireless receiver unit 41 adopts a receiver chip AMN2220 or AMN3210 which is manufactured by Amimon and which applies WHDI technology, but is not limited to the disclosure of this embodiment. The wireless receiver unit 41 receives the wireless AV signal transmitted from the AV source device 100, demodulates the wireless AV signal to obtain the upscaled AV signal, and outputs the upscaled AV signal to the AV playback unit 42. Subsequently, the AV playback unit 42 outputs the upscaled AV signal to the high resolution display 43 for display.

Since the lower resolution video signal of the AV signal generated by the AV source device 100 has been upscaled from the standard definition to the high definition by the video scaler unit 31 before being transmitted to the high resolution display 43 of the AV playback device 200 for display, images displayed on the high resolution display 43 may not be deformed or distorted arising from insufficient resolution when the upscaled AV signal is transmitted to the high resolution display 43 of the AV playback device 200 for display. Therefore, no matter which kind of lower resolution video signal is generated by the AV source unit 20, images with optimized resolution may be displayed on the high resolution display 43.

Figure 3:
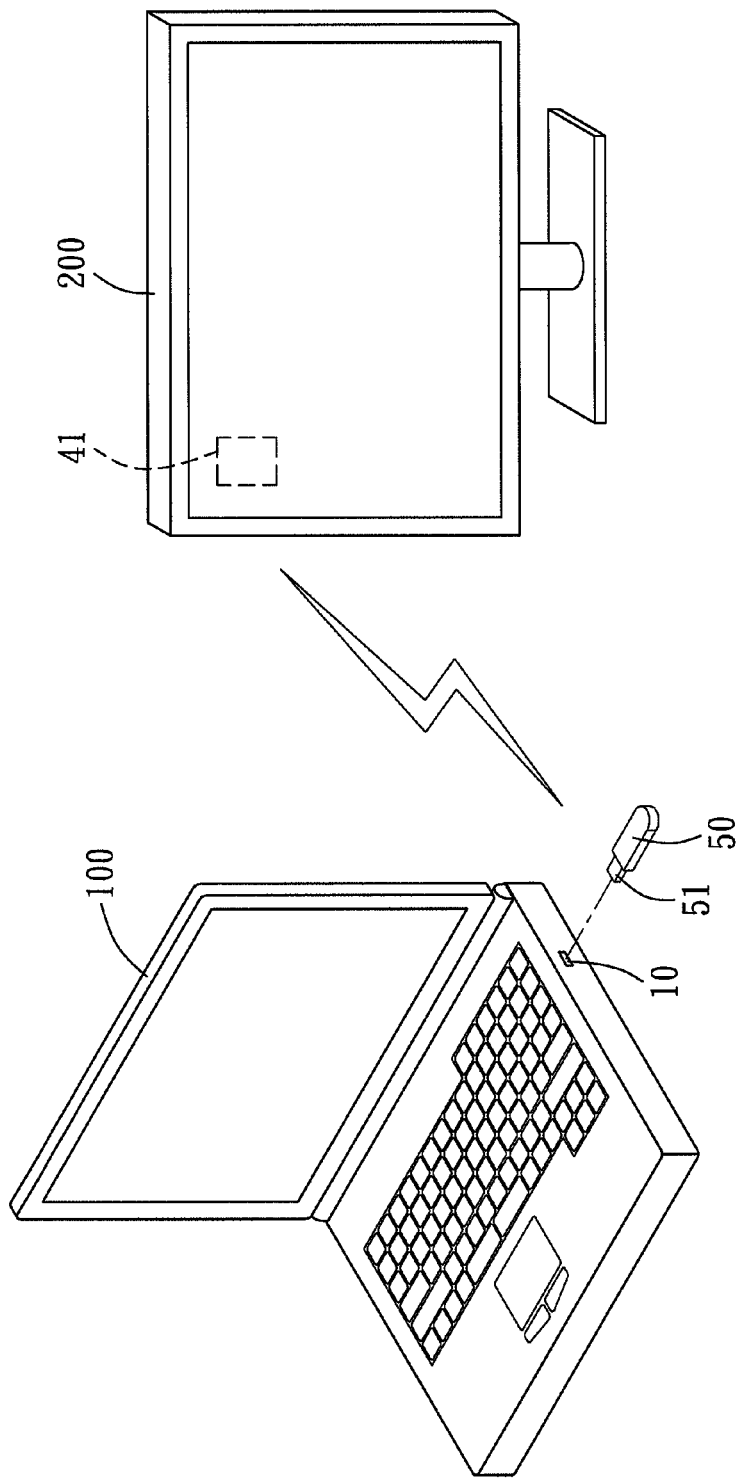
FIG. 3 is a schematic diagram illustrating a second preferred embodiment of the wireless AV transmission module of the present invention, in which the wireless AV transmission module is disposed in a portable wireless AV transmission device pluggably connected to an AV source device.

Referring to FIG. 3, a second preferred embodiment of the wireless AV transmission module 30 of the present invention is illustrated. This embodiment differs from the previous embodiment in the configuration that the wireless AV transmission module 30 may not only be built into the AV source device 100, but may also be implemented as an external portable wireless AV transmission device 50 as illustrated in FIG. 3. The portable wireless AV transmission device 50 is electrically and pluggably coupled to the AV source device 100 via a connector 51 which is matched with an AV output terminal 10 of the AV source device 100 such as a VGA terminal, a HDMI terminal or a USB connector of the AV source device 100, such that the portable wireless AV transmission device 50 may be carried by users and may be put to use in different AV source devices 100.

Figure 4:
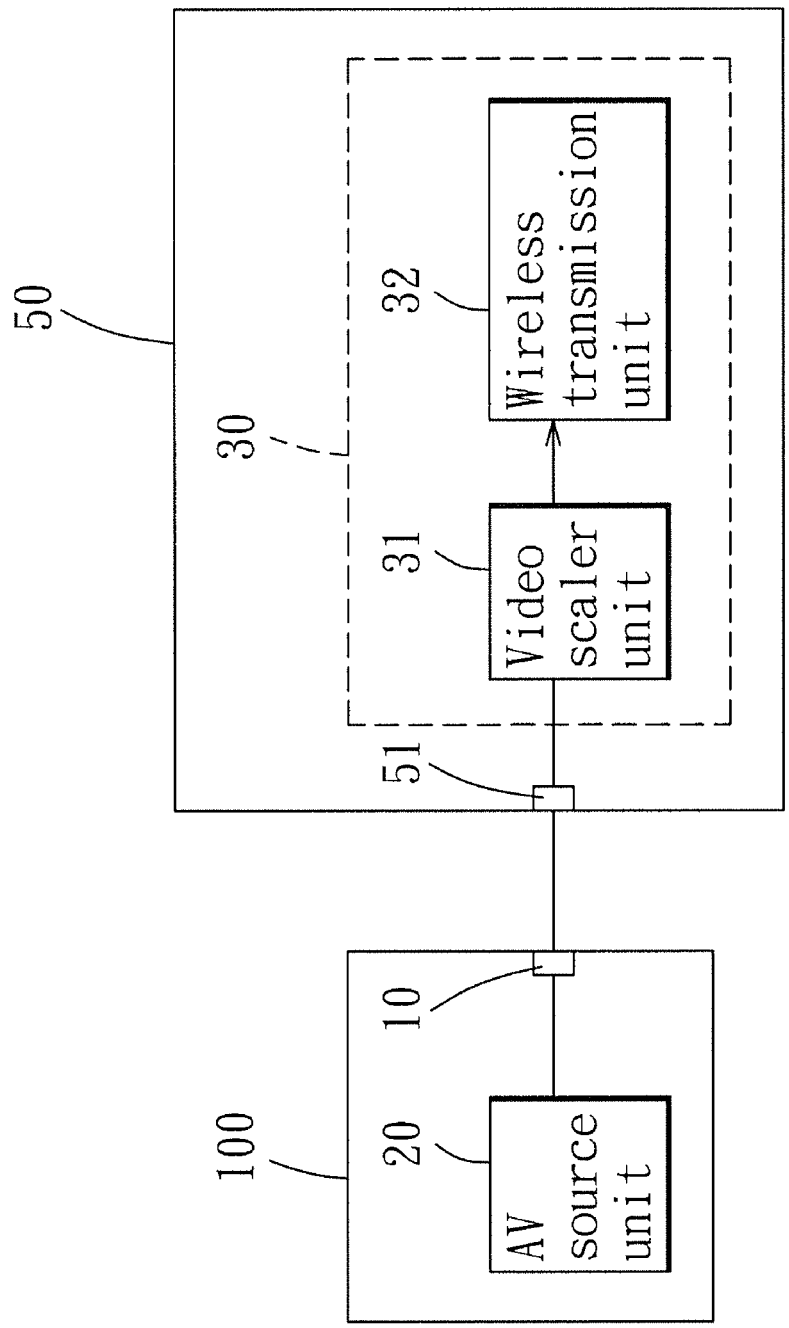
FIG. 4 is a block diagram illustrating the portable wireless AV transmission device and the AV source device in the second preferred embodiment of the wireless AV transmission module.

Referring to FIG. 4, the portable wireless AV transmission device 50 includes the aforementioned wireless AV transmission module 30 and the connector 51. The portable wireless AV transmission device 50 is coupled electrically to the AV source unit 20 of the AV source device 100 via the connector 51, such that the video signal of the AV signal generated by the AV source unit 20 is upscaled and wirelessly transmitted to the AV playback device 200 which is capable of receiving wireless AV signals.

Figure 5:
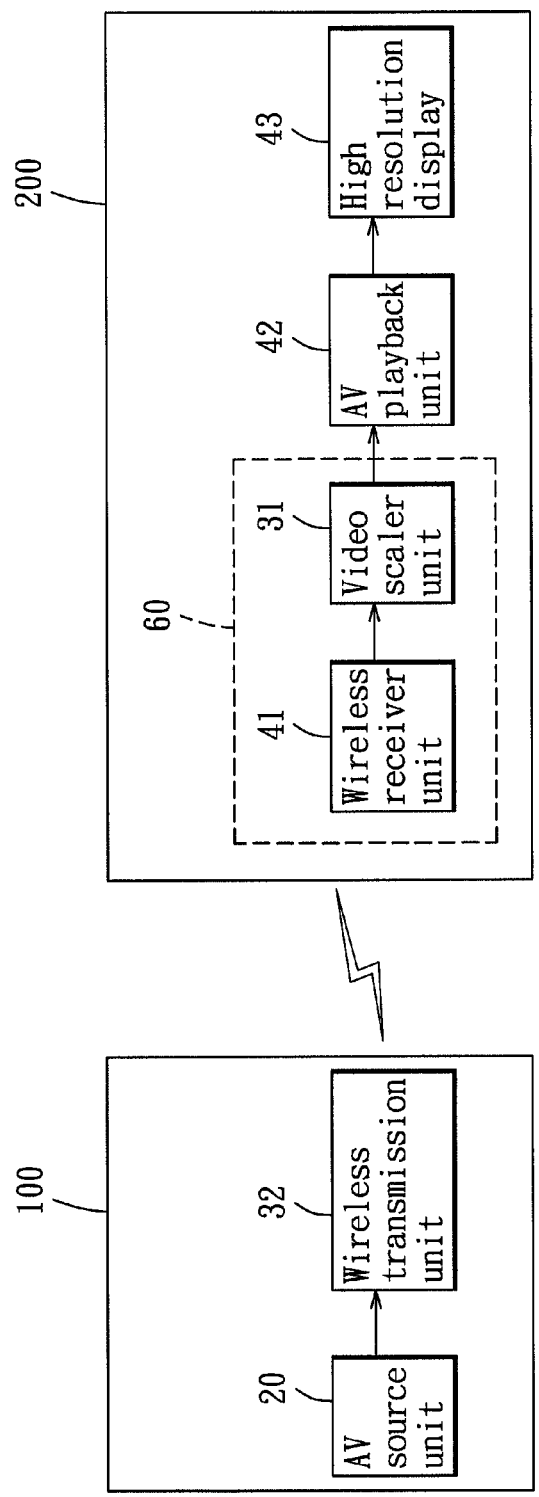
FIG. 5 is a block diagram illustrating a first preferred embodiment of the wireless AV receiver module of the present invention, in which the wireless AV transmission module is disposed in an AV playback device.

Referring to FIG. 5, a first preferred embodiment of a wireless AV receiver module 60 of the present invention is illustrated. The wireless AV receiver module 60 is to be built into the AV playback device 200, and is for receiving and upscaling a video signal of an AV signal from an AV source device 100. The AV playback device 200 includes an AV playback unit 42 and a high resolution display 43. The AV source device 100 includes an AV source unit 20 and a wireless transmission unit 32, and transmits the AV signal generated by the AV source unit 20 to the AV playback device 200 via the wireless transmission unit 32. The wireless AV receiver module 60 includes a wireless receiver unit 41 and a video scaler unit 31. The wireless receiver unit 41 is for receiving the AV signal. The video scaler unit 31 is coupled electrically to the wireless receiver unit 41 and the AV playback unit 42, and is for upscaling the video signal of the AV signal received through the wireless receiver unit 41, and outputting an upscaled AV signal including the upscaled video signal to the AV playback unit 42, such that the upscaled video signal is outputted to the high resolution display 43.

Figure 6:
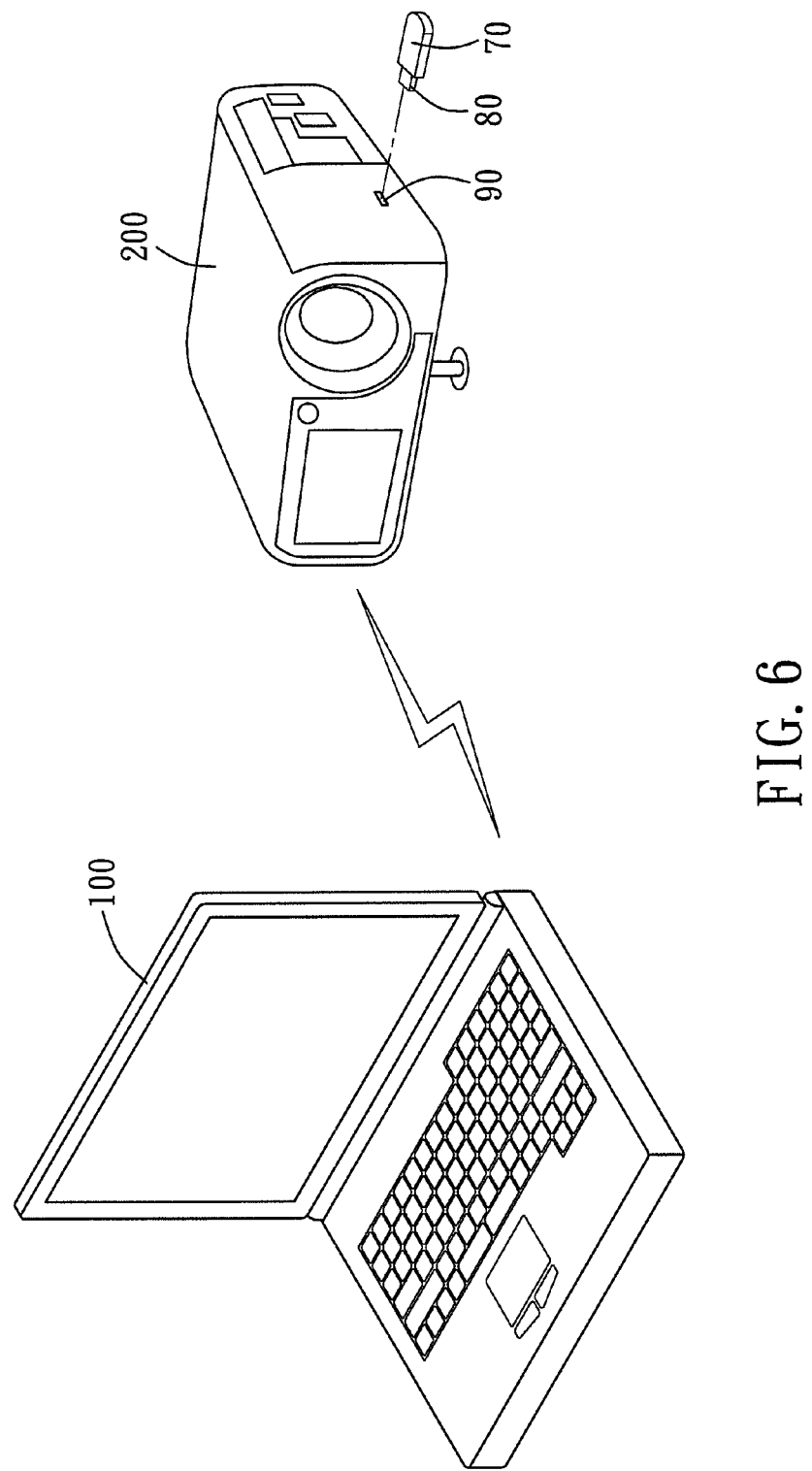
FIG. 6 is a schematic diagram illustrating a second preferred embodiment of the wireless AV receiver module of the present invention, in which the wireless AV receiver module is disposed in a portable wireless AV receiver device pluggably connected to an AV playback device.
Figure 7:
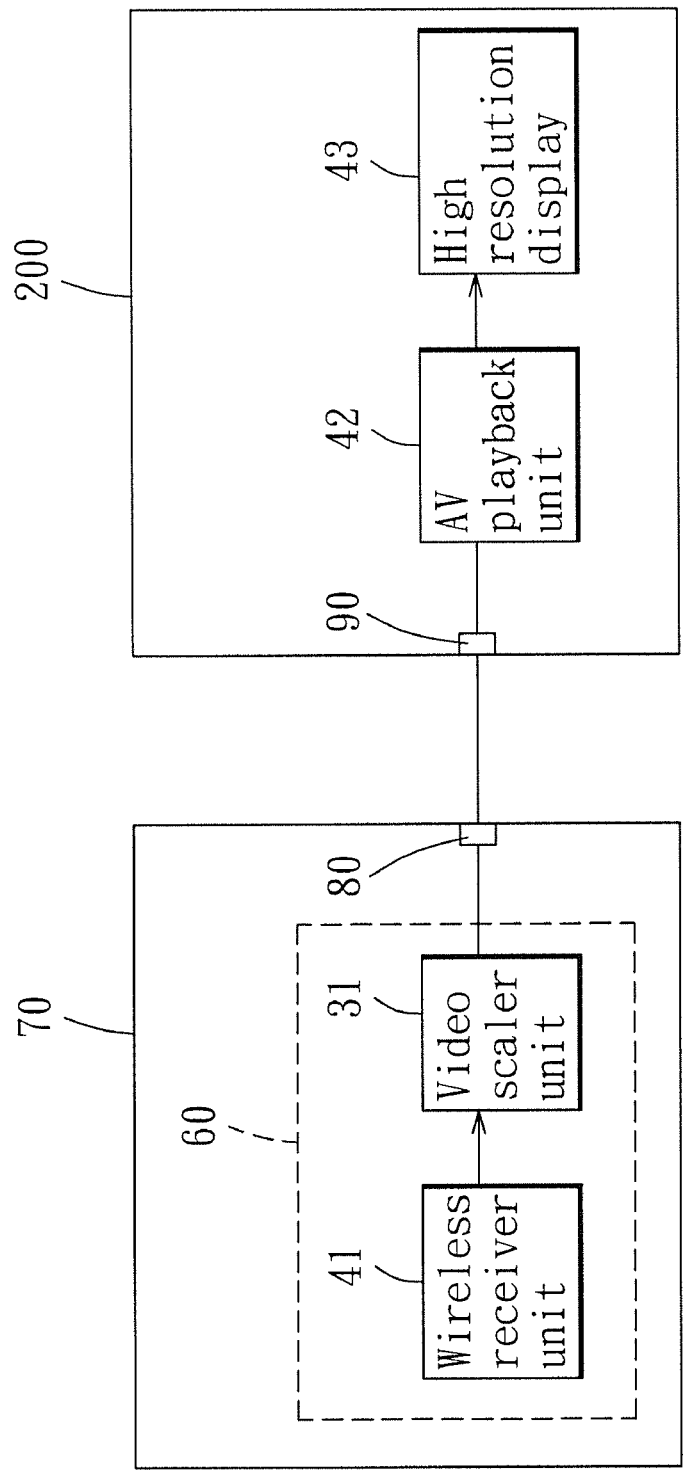
FIG. 7 is a block diagram illustrating the portable wireless AV receiver device and the AV playback device in the second preferred embodiment of the wireless AV receiver module.

Referring to FIG. 6 and FIG. 7, a second preferred embodiment of the wireless AV receiver module 60 of the present invention is illustrated. Similar to the second preferred embodiment of the wireless AV transmission module 30, the wireless AV receiver module 60 may be disposed in an external portable wireless AV receiver device 70 as illustrated in FIG. 6, such that the portable wireless AV receiver device 70 may be carried by users and may be put to use in different AV playback devices 200. Referring to FIG. 7, the portable wireless AV receiver device 70 includes the aforementioned wireless AV receiver module 60 and a connector 80. The portable wireless AV receiver device 70 is electrically and pluggably coupled to the AV playback device 200 via the connector 80 which is matched with an AV input terminal 90 which in turn is electrically coupled to the AV playback unit 42 of the AV playback device 200, such that the upscaled AV signal including the upscaled video signal outputted from the video scaler unit 31 is outputted to the high resolution display 43 via the AV playback unit 42.

In summary, by means of disposing the wireless AV transmission module 30 in the AV source device 100 or disposing the wireless AV receiver module 60 in the AV playback device 200, the AV signal is transmitted through wireless AV transmission technology, and the video signal, which is a lower resolution video signal, of the AV signal is upscaled and outputted to the high resolution display 43. In this way, resources of the central processing unit in the AV source device 100 or the AV playback device 200 may be saved from consumption that arises from processing image upscaling, and the lower resolution video signal outputted from the AV source device 100 may be displayed on the high resolution display 43 with optimized image quality.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A portable wireless audio-video (AV) transmission device for pluggable connection to an AV source device, the AV source device including an AV source unit for generating an AV signal, and an output terminal for outputting the AV signal, the portable wireless AV transmission device comprising:
   a non-dedicated attachment selectively connectable to adaptively serve a plurality of different AV source devices, the non-dedicated attachment having a connector to be directly plugged and thereby electrically coupled without intervening transmission cable to the output terminal of the selected AV source device operating at a first video resolution, for receiving the AV signal;
   a video scaler unit housed within the non-dedicated attachment and electrically coupled to the connector, for upscaling a video signal of the AV signal received through the connector from the first video resolution to a second video resolution compatible with a playback device, the second video resolution being different from the first video resolution and outputting an upscaled AV signal including the upscaled video signal, the video scaler unit thereby maintaining AV signal upscaling operation external to the AV source and playback devices; and
   a wireless transmission unit housed within the non-dedicated attachment and electrically coupled to the video scaler unit, for wirelessly modulating and transmitting the upscaled AV signal that includes the upscaled video signal from the non-dedicated attachment in uncompressed format to the playback device.

2. The portable wireless AV transmission device as claimed in claim 1, wherein the video signal is a Standard-Definition Television (SDTV) signal, and the video scaler unit is a video scaler chip which upscales the SDTV signal from a standard definition to a high definition and outputs the upscaled video signal, in which the upscaled video signal is a High-Definition Television (HDTV) signal.

3. The portable wireless AV transmission device as claimed in claim 1, wherein the wireless transmission unit adopts Wireless Home Digital Interface (WHDI) technology for transmitting the upscaled AV signal.

4. The portable wireless audio-video (AV) transmission device as claimed in claim 1, wherein the connector includes a protrusive plug member affixed to and extending from the portable wireless AV transmission device to be pluggably inserted into and electrically coupled to the external output terminal of the AV source device.

5. The portable wireless audio-video (AV) transmission device as claimed in claim 4, wherein the connector is pluggably and electrically coupled to the output terminal of the AV source device for receiving the AV signal and an electrical power supplied from the AV source device.

6. A portable wireless audio-video (AV) receiver device for pluggable connection to an AV playback device, the AV playback device including an input terminal, an AV playback unit, and a high resolution display, the portable wireless AV receiver device comprising:
   a non-dedicated attachment selectively connectable to adaptively serve a plurality of different AV playback devices, the non-dedicated attachment having a wireless receiver unit for wirelessly receiving and demodulating an AV signal from an AV source device operating at a first video resolution;
   a video scaler unit housed within the non-dedicated attachment and electrically coupled to the wireless receiver unit, for upscaling a video signal of the AV signal received through the wireless receiver unit from the first video resolution to a second video resolution compatible with the AV playback device, the second resolution being different from the first video resolution and outputting an upscaled AV signal including the upscaled video signal, the video scaler unit thereby maintaining AV signal upscaling operation external to the AV source and playback devices; and
   a connector housed within the non-dedicated attachment and electrically coupled to the video scaler unit for receiving the upscaled AV signal, the connector to be directly plugged and thereby electrically coupled without intervening transmission cable to the input terminal of the AV playback device for transmitting the upscaled AV signal including the upscaled video signal to the AV playback unit via the input terminal, such that the upscaled video signal is outputted to the high resolution display.

7. The portable wireless AV receiver device as claimed in claim 6, wherein the video signal is a Standard-Definition Television (SDTV) signal, and the video scaler unit is a video scaler chip which upscales the SDTV signal from a standard definition to a high definition and outputs the upscaled video signal, in which the upscaled video signal is a High-Definition Television (HDTV) signal.

8. The portable wireless AV receiver device as claimed in claim 6, wherein the wireless receiver unit adopts Wireless Home Digital Interface (WHDI) technology for receiving the AV signal.

9. The portable wireless audio-video (AV) receiver device as claimed in claim 6, wherein the connector includes a protrusive plug member affixed to and extending from the portable wireless AV receiver device to be pluggably inserted into and electrically coupled to the external input terminal of the AV playback device.

10. The portable wireless AV receiver device as claimed in claim 9, wherein the connector is pluggably and electrically coupled to the input terminal of the AV playback device for receiving an electrical power supplied from the AV playback device.

\* \* \* \* \*